US011447656B2

(12) United States Patent
Nowak et al.

(10) Patent No.: US 11,447,656 B2
(45) Date of Patent: Sep. 20, 2022

(54) ANTI-FOULING COATINGS FABRICATED FROM POLYMERS CONTAINING IONIC SPECIES

(71) Applicant: HRL Laboratories, LLC, Malibu, CA (US)

(72) Inventors: Andrew P. Nowak, Los Angeles, CA (US); Adam F. Gross, Santa Monica, CA (US); April R. Rodriguez, Santa Monica, CA (US); Ashley Nelson, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 121 days.

(21) Appl. No.: 16/273,908

(22) Filed: Feb. 12, 2019

(65) Prior Publication Data

US 2019/0177572 A1  Jun. 13, 2019

Related U.S. Application Data

(62) Division of application No. 15/073,610, filed on Mar. 17, 2016, now Pat. No. 10,259,971.

(Continued)

(51) Int. Cl.
*C09D 175/00* (2006.01)
*C09D 5/00* (2006.01)
(Continued)

(52) U.S. Cl.
CPC ....... *C09D 175/08* (2013.01); *C08G 18/0819* (2013.01); *C08G 18/0823* (2013.01);
(Continued)

(58) Field of Classification Search
CPC .......... C09D 175/08; C09D 7/40; C09D 7/63; C09D 5/1662; G08G 18/0819;
(Continued)

(56) References Cited

U.S. PATENT DOCUMENTS 3,435,003 A   3/1969 Craven
3,810,874 A   5/1974 Mitsch et al.
(Continued)

FOREIGN PATENT DOCUMENTS

EP   1558661 B1   12/2012
WO   2013158360 A1   10/2013

OTHER PUBLICATIONS

"Synthesis and characterization of calcium-containing polyurethane using calcium lactate as a chain extender" Nair et al. Polymer Journal (2012) 44, 1009-1014.*

(Continued)

*Primary Examiner* — Michael L Leonard
(74) *Attorney, Agent, or Firm* — O'Connor & Company; Ryan P. O'Connor (57) ABSTRACT

An anti-fouling coating is provided, containing a continuous matrix comprising a first component; a plurality of inclusions comprising a second component, wherein the first component is a low-surface-energy polymer having a surface energy, and the second component is a hygroscopic material containing one or more ionic species. The low-surface-energy polymer and the hygroscopic material are chemically connected ionically or covalently, such as in a segmented copolymer composition comprising fluoropolymer soft segments and ionic species contained within the soft segments. The continuous matrix and the inclusions form a lubricating surface layer in the presence of humidity. Coefficient-of-friction experimental data is presented for various sample coatings. The incorporation of ionic species into the polymer chain backbone increases the hygroscopic behavior of the overall structure. Improvement in lubrication enables material to be cleared from a surface using the natural motion of an automotive or aerospace vehicle.

7 Claims, 2 Drawing Sheets

Related U.S. Application Data (60) Provisional application No. 62/269,984, filed on Dec. 19, 2015, provisional application No. 62/269,366, filed on Dec. 18, 2015.

(51) Int. Cl.

| | | |
|---|---|---|
| C08G 18/50 | (2006.01) | |
| C09D 175/08 | (2006.01) | |
| C08G 18/08 | (2006.01) | |
| C08G 18/48 | (2006.01) | |
| C08G 18/38 | (2006.01) | |
| C08G 18/75 | (2006.01) | |
| C08G 18/24 | (2006.01) | |
| C08G 18/34 | (2006.01) | |
| C09D 7/40 | (2018.01) | |
| C09D 7/63 | (2018.01) | |
| C08K 5/3445 | (2006.01) | |
| C09D 5/16 | (2006.01) | |
| C08K 5/09 | (2006.01) | |

(52) U.S. Cl.
CPC ....... *C08G 18/0833* (2013.01); *C08G 18/246* (2013.01); *C08G 18/348* (2013.01); *C08G 18/3812* (2013.01); *C08G 18/4804* (2013.01); *C08G 18/5015* (2013.01); *C08G 18/758* (2013.01); *C08K 5/3445* (2013.01); *C09D 5/1662* (2013.01); *C09D 7/40* (2018.01); *C09D 7/63* (2018.01); *C08G 2150/90* (2013.01); *C08K 5/09* (2013.01)

(58) Field of Classification Search
CPC ........... G08G 18/0823; G08G 18/0833; G08G 18/246; G08G 18/348; G08G 18/3812; G08G 18/4804; G08G 18/5015; G08G 18/758
See application file for complete search history.

(56) References Cited

U.S. PATENT DOCUMENTS

| | | |
|---|---|---|
| 3,847,978 A | 11/1974 | Sianesi et al. |
| 4,777,224 A | 10/1988 | Gorzynski et al. |
| 4,956,438 A | 9/1990 | Ruetman et al. |
| 5,032,666 A | 7/1991 | Hu et al. |
| 5,084,315 A | 1/1992 | Karimi et al. |
| 5,097,010 A * | 3/1992 | Markle .............. C08G 18/2815 525/195 |
| 5,189,135 A | 2/1993 | Cozzi et al. |
| 5,332,798 A | 7/1994 | Ferreri et al. |
| 5,516,850 A * | 5/1996 | Klauck ................... C04B 28/28 428/480 |
| 5,589,552 A | 12/1996 | Simeone et al. |
| 6,071,564 A | 6/2000 | Marchetti et al. |
| 6,926,937 B2 | 8/2005 | Extrand et al. |
| 6,992,132 B2 | 1/2006 | Trombetta et al. |
| 7,655,310 B2 | 2/2010 | Trombetta |
| 2004/0019143 A1 | 1/2004 | Koloski et al. |
| 2005/0164010 A1 | 7/2005 | Trombetta |
| 2008/0219944 A1 | 9/2008 | Longo et al. |
| 2010/0324205 A1 | 12/2010 | Maier et al. |
| 2011/0218290 A1 | 9/2011 | Webster et al. |
| 2011/0213085 A1 | 11/2011 | Tonelli et al. |
| 2012/0164565 A1 | 6/2012 | Qiu |
| 2015/0158969 A1 | 6/2015 | Nowak |
| 2015/0329453 A1 | 11/2015 | Guarda et al. |

OTHER PUBLICATIONS

Vaidya et al., "Synthesis and Surface Properties of Environmentally Responsive Segmented Polyurethanes," Journal of Colloid and Interface Science 249, 235-245 (2002).

Siochi et al., "Engineered Surfaces for Mitigation of Insect Residue Adhesion" NF1676L-15481 SAMPE 2013; May 6-9, 2013; Long Beach, CA; United States.

Wohl et al., "Evaluation of commercially available materials to mitigate insect residue adhesion on wing leading edge surfaces," Progress in Organic Coatings 76 (2013) 42-50.

Kok et al., "Influence of surface characteristics on insect residue adhesion to aircraft leading edge surfaces," Progress in Organic Coatings 76 (2013) 1567-1575.

Lee et al., "Zwitter-Wettability and Antifogging Coatings with Frost-Resisting Capabilities," ACS Nano 7 (2013) 2172-2185.

Chen et al., "Robust Prototypical Anti-icing Coatings with a Self-lubricating Liquid Water Layer between Ice and Substrate," ACS Appl. Mater. Interfaces 5 (2013) 4026-4030.

Turri et al., "Waterborne Anionomeric Polyurethane-Ureas from Functionalized Fluoropolyethers," Journal of Applied Polymer Science, vol. 93, 136-144 (2004).

Dou et al., "Anti-icing Coating with an Aqueous Lubricating Layer," ACS Appl. Mater. Interfaces 2014, 6, 6998-7003.

Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.

Chen et al., "A Thermally Re-mendable Cross-Linked Polymeric Material," Science 295 (5560), 1698-1702, Mar. 1, 2002.

Oster et al., "Photoreduction of Metal Ions by Visible Light," Departmenotf Chemistry, Polytechnic Institute of Brooklyn, 135th National meeting of the American Chemical Society, Nov. 5, 1959.

Wojtecki et al., "Using the dynamic bond to access macroscopically responsive structurally dynamic polymers," Nature Materials vol. 10, Jan. 2011.

* cited by examiner

| Sample from Examples A-E | Coefficient of Friction at 40-55% R.H.* | Coefficient of Friction at 85-90% R.H.* | Contact Angle of Water on Coating |
|---|---|---|---|
| Sample A | 0.93 | 0.7 | 97° |
| Sample B | 0.14 | 0.23 | — |
| Sample C1 | 0.19 | 0.17 | 97° |
| Sample C2 | 0.17 | 0.17 | 107° |
| Sample C3 | 0.16 | 0.14 | 94° |
| Sample C4 | 0.17 | 0.13 | 99° |
| Sample D1 | 0.38 | 0.62 | — |
| Sample D2 | 0.40 | 0.32 | — |
| Sample D3 | 0.22 | 0.62 | — |
| Sample E1 | 0.21 | 0.22 | 108° |
| Sample E2 | 0.16 | 0.21 | 104° |
| Sample E3 | 0.14 | 0.33 | 103° |
| Sample E4 | 0.15 | 0.18 | 101° |
| Sample E5 | 0.16 | 0.33 | — |

*R.H. = Relative Humidity

ANTI-FOULING COATINGS FABRICATED FROM POLYMERS CONTAINING IONIC SPECIES

PRIORITY DATA

This patent application is a divisional application of U.S. patent application Ser. No. 15/073,610, filed on Mar. 17, 2016, which claims priority to U.S. Provisional Patent App. No. 62/269,366, filed on Dec. 18, 2015, and to U.S. Provisional Patent App. No. 62/269,984, filed on Dec. 19, 2015, each of which is hereby incorporated by reference herein.

FIELD OF THE INVENTION

The present invention generally relates to anti-fouling materials, coatings, and systems.

BACKGROUND OF THE INVENTION

Coatings and materials can become soiled from debris (particles, insects, oils, etc.) impacting the surface. The debris affects airflow over the surface as well as aesthetics and normally is removed by washing.

Many attempts are described to mitigate insect accumulation during the early days of aircraft development. These include mechanical scrapers, deflectors, traps, in-flight detachable surfaces, in-flight dissolvable surfaces, viscous surface fluids, continuous washing fluids, and suction slots. The results of most of these trials were determined ineffective or impractical for commercial use.

Recently, Wohl et al., "Evaluation of commercially available materials to mitigate insect residue adhesion on wing leading edge surfaces," *Progress in Organic Coatings* 76 (2013) 42-50 describe work at NASA to create anti-insect adhesion surfaces. Wohl et al. tested the effect of organic-based coatings on insect adhesion to surfaces, but the coatings did not fully mitigate the issue. Wohl et al. also describe previously used approaches to reduce bug adhesion such as mechanical scrapers, deflectors, paper and/or other coverings, elastic surfaces, soluble films, and washing the surface continually with fluid.

One approach is to create a self-cleaning surface that removes debris from itself by controlling chemical interactions between the debris and the surface. Enzyme-filled coatings leech out enzymes that dissolve debris on the surface. However, the enzymes are quickly depleted and cannot be refilled, rendering this approach impractical. Fluorofluid-filled surfaces have very low adhesion between impacting debris and the surface. However, if any of the fluid is lost, the surface cannot be refilled/renewed once applied on the vehicle, and thus loses its properties (see Wong et al., "Bioinspired self-repairing slippery surfaces with pressure-stable omniphobicity," *Nature* 477, 443-447, 2011).

Superhydrophobic and superoleophobic surfaces create very high contact angles)(>150° between the surface and drops of water and oil, respectively. The high contact angles result in the drops rolling off the surface rather than remaining on the surface. These surfaces do not repel solid foreign matter or vapors of contaminants. Once soiled by impact, debris will remain on the surface and render it ineffective. Also, these surfaces lose function if the nanostructured top surface is scratched.

Kok et al., "Influence of surface characteristics on insect residue adhesion to aircraft leading edge surfaces," *Progress in Organic Coatings* 76 (2013) 1567-1575, describe various polymer, sol-gel, and superhydrophobic coatings tested for reduced insect adhesion after impact. The best-performing materials were high-roughness, superhydrophobic surfaces. However, they did not show that debris could be removed from the superhydrophobic surfaces once insects broke on the surface.

Fluoropolymer sheets or treated surfaces have low surface energies and thus low adhesion force between foreign matter and the surface. However, friction between impacting debris and the surface results in the sticking of contaminants.

Polymeric materials having low surface energies are widely used for non-stick coatings. These materials are tailored with careful control of their chemical composition (thus surface energy) and mechanical properties. Polymers containing low-energy perfluoropolyethers and perfluoroalkyl groups have been explored for low adhesion and solvent repellency applications. While these low-energy polymers facilitate release of materials adhering to them in both air and water, they do not necessarily provide a lubricated surface to promote clearance foreign substances. See Vaidya and Chaudhury, "Synthesis and Surface Properties of Environmentally Responsive Segmented Polyurethanes," *Journal of Colloid and Interface Science* 249, 235-245 (2002).

A fluorinated polyurethane is described in U.S. Pat. No. 5,332,798 issued Jul. 26, 1994 to Ferreri et al. U.S. Pat. No. 4,777,224 to Gorzynski et al. describes the process for the production of anionic polyurethanes comprising aliphatic dihydroxy compounds (greater than 10 carbon atoms), an aliphatic diol carrying an acid group, and a polyether. The polyurethane aqueous solutions are used for coating and sizing of paper. U.S. Pat. No. 4,956,438 to Ruetman et al. describes the composition and preparation of polyurethane ionomers synthesized by making an ionic prepolymer and chain-extending it with a polyol requiring three or more reactive hydroxyl groups. U.S. Pat. No. 7,655,310 to Trombetta describes polyurethanes containing perfluoropolyethers with ionizable groups such as a carboxylic acid or amine functionality for making waterborne systems. The patent also describes the use of pendant silanes (i.e. trimethoxysilane groups) for crosslinking the network. U.S. Pat. No. 6,992,132 to Trombetta et al. describes an aqueous dispersion of a linear crosslinkable ionomeric polyurethane containing carboxylic groups and having a perfluoropolyether structure and a crosslinking agent.

In view of the shortcomings in the art, improved coating materials and material systems, and compositions suitable for these coating systems, are needed. Improvement in lubrication or decrease in the coefficient of friction would better enable material to be cleared from a surface using the natural motion of an automotive or aerospace vehicle.

SUMMARY OF THE INVENTION

The present invention addresses the aforementioned needs in the art, as will now be summarized and then further described in detail below.

Some variations provide a segmented copolymer composition comprising:

(a) one or more first soft segments selected from fluoropolymers having an average molecular weight from about 500 g/mol to about 20,000 g/mol, wherein the fluoropolymers are $(\alpha,\omega)$-hydroxyl-terminated and/or $(\alpha,\omega)$-amine-terminated;

(b) optionally, one or more second soft segments selected from polyesters or polyethers, wherein the polyesters or polyethers are $(\alpha,\omega)$-hydroxyl-terminated and/or $(\alpha,\omega)$-amine-terminated;

(c) one or more ionic species contained within the soft segments and/or contained in copolymer chains that are distinct from the soft segments;

(d) one or more isocyanate species, or a reacted form thereof, possessing an isocyanate functionality of 2 or greater;

(e) one or more polyol or polyamine chain extenders or crosslinkers, or a reacted form thereof.

In some embodiments, the fluoropolymers are selected from the group consisting of polyfluoroethers, perfluoropolyethers, polyfluoroacrylates, polyfluorosiloxanes, and combinations thereof. For example, the fluoropolymers may include a fluoropolymer having the structure:

wherein:
X=CH$_2$—(O—CH$_2$—CH$_2$)$_p$—OH wherein p=0 to 50;
m=1 to 100; and
n=1 to 100.

When the one or more second soft segments are present, the polyesters or polyethers may be selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof. The molar ratio of the second soft segments (when present) to the first soft segments may be less than 2.0.

In some embodiments, the ionic species are contained chemically within the first soft segments and/or within the second soft segments (if present). In these or other embodiments, the ionic species are present as, or in, polymer-chain pendant groups within the first soft segments. In these or other embodiments with the second soft segments present, the ionic species are present as, or in, polymer-chain pendant groups within the second soft segments. In certain embodiments, the ionic species are contained chemically in hard segments containing the reacted form of the one or more isocyanate species. Alternatively, or additionally, the ionic species may be contained chemically in copolymer chains that are distinct from each of the first soft segments, second soft segments, and hard segments.

The ionic species may be ($\alpha,\omega$)-hydroxyl-terminated and/or ($\alpha,\omega$)-amine-terminated, in some embodiments. The ionic species may include a cationic species possessing a charge of +1 or more, or +2 or more. The ionic species may include an anionic species possessing a charge of −1 or more negative, or −2 or more negative.

In some embodiments, the ionic species includes an ionizable salt or other ionizable molecule. In certain embodiments, the ionic species includes a zwitterionic component. In some embodiments, the ionic species includes a polyelectrolyte or an ionomer.

The ionic species may be selected from the group consisting of 2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3$\lambda^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extenders or crosslinkers may have an average functionality of at least 2.0, 2.1, 2.2, 2.3, 2.4, 2.5, 2.6, 2.7, 2.8, 2.9, 3.0, or higher. The one or more polyol or polyamine chain extenders or crosslinkers may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexane diol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-buatendiamine, diethyltoluenediamine, dimethylthiotoluenediamine, isophoronediamine, diaminocyclohexane, N,N,N',N'-tetrakis (2-hydroxypropyl) ethylenediamine, and homologues, combinations, derivatives, or reaction products thereof.

The composition contains, in a hard segment, the reacted form of the one or more isocyanate species, combined with the reacted form of the one or more polyol or polyamine chain extenders or crosslinkers, in some embodiments.

The segmented copolymer composition may be present in a coating or other suitable material or object.

Some variations of the invention provide an anti-fouling coating comprising:

a substantially continuous matrix containing a first component;

a plurality of inclusions containing a second component, wherein the inclusions are dispersed within the matrix;

wherein one of the first component or the second component is a low-surface-energy polymer having a surface energy between about 5 mJ/m$^2$ to about 50 mJ/m$^2$, and the other of the first component or the second component is a hygroscopic material containing one or more ionic species, wherein the low-surface-energy polymer and the hygroscopic material are chemically connected ionically or covalently, and wherein the continuous matrix and the inclusions form a lubricating surface layer in the presence of humidity.

In some embodiments, the low-surface-energy polymer is a fluoropolymer selected from the group consisting of polyfluoroethers, perfluoropolyethers, polyfluoroacrylates, polyfluorosiloxanes, and combinations thereof.

The ionic species may be selected from the group consisting of 2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3$\lambda^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2- hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

In certain embodiments, the hygroscopic material consists essentially of the ionic species. In some embodiments, the hygroscopic material further includes a material selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacryalate, monoacrylate, and combinations thereof.

The low-surface-energy polymer and the hygroscopic material may be covalently connected in a block copolymer. In some embodiments, the block copolymer includes a segmented copolymer composition comprising:

(a) one or more first soft segments selected from fluoropolymers having an average molecular weight from about 500 g/mol to about 20,000 g/mol, wherein the fluoropolymers are $(\alpha,\omega)$-hydroxyl-terminated and/or $(\alpha,\omega)$-amine-terminated;

(b) optionally, one or more second soft segments selected from polyesters or polyethers, wherein the polyesters or polyethers are $(\alpha,\omega)$-hydroxyl-terminated and/or $(\alpha,\omega)$-amine-terminated;

(c) one or more ionic species contained within the soft segments and/or contained in copolymer chains that are distinct from the soft segments;

(d) one or more isocyanate species, or a reacted form thereof, possessing an isocyanate functionality of 2 or greater;

(e) one or more polyol or polyamine chain extenders or crosslinkers, or a reacted form thereof, wherein the molar ratio of the second soft segments (if present) to the first soft segments is less than 2.0.

The fluoropolymers may include a fluoropolymer having the structure:

wherein:
$X=CH_2-(O-CH_2-CH_2)_p-OH$ wherein $p=0$ to 50;
$m=1$ to 100; and
$n=1$ to 100.

The coating optionally comprises one or more additional components selected from the group consisting of a particulate filler, a substrate adhesion promoter, a pigment, a dye, a plasticizer, a flattening agent, and a flame retardant. The particulate filler (when present) may be selected from the group consisting of silica, alumina, silicates, talc, aluminosilicates, barium sulfate, mica, diatomite, calcium carbonate, calcium sulfate, carbon, wollastonite, and combinations or surface-treated derivatives thereof.

DETAILED DESCRIPTION OF EMBODIMENTS OF THE INVENTION

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations of this invention are premised on the discovery of a material that possesses both low surface energy (for low adhesion) and the ability to absorb water. A structured material or coating, as disclosed, passively absorbs water from the atmosphere, to create a lubrication/self-cleaning layer and reduce the friction and adhesion of the impacting body (such as an insect) on the surface. This anti-fouling material may be used as a coating or as a surface.

U.S. patent application Ser. No. 14/658,188 (filed Mar. 14, 2015) and U.S. patent application Ser. No. 14/829,640 (filed Aug. 19, 2015), which both have a common assignee with the present application, are hereby incorporated by reference herein. These patent applications disclose, among other things, certain embodiments combining a fluorinated perfluoropolyether (PFPE) as a low-surface-energy component and polyethylene glycol (PEG) as a water-absorbing species in a urethane-based segmented copolymer. The present invention is predicated on the incorporation of ionic species into or onto the polymer chain backbone to increase the water-absorbing power (hygroscopic behavior) of the overall structure, beyond that of the PEG species alone. Improvement in lubrication or decrease in the coefficient of friction better enables material to be cleared from a surface using the natural motion of an automotive or aerospace vehicle, for example. The present invention, in some variations, is premised on the incorporation of ionic species in the coating to increase the amount of water naturally absorbed from the atmosphere and thus increase the lubrication, i.e. decrease the coefficient of friction at the surface.

An anti-fouling coating in some embodiments may be characterized as "bugphobic," which is intended to mean the coating has relatively low adhesion with an impacting bug. Because these materials trap a layer of water near the surface, they also can delay the formation of ice, in some embodiments. An anti-fouling coating in some embodiments may be characterized as "icephobic," which is intended to mean the coating is capable of delaying the formation of ice and/or causing a freezing-point depression of ice, compared to a bare substrate. The lubricating component has the ability to trap and organize a layer of water at the surface to inhibit freezing.

The disclosed anti-fouling material can absorb water from the air and use this water as a lubricant to wash and remove debris from the surface. The surface contains domains of a low-surface-energy polymer (such as, but not limited to, a fluoropolymer) providing low adhesion, and domains of a hygroscopic material. The atmospheric water is thus captured as a lubricant and is a continually available, renewable resource.

By reducing friction, the debris is less likely to embed in or otherwise attach to the surface and instead will tend to slough off the surface, particularly under the shear forces from air moving over a vehicle surface. Debris may be organic or inorganic and may include insects, dirt, dust, soot, ash, pollutants, particulates, ice, seeds, plant or animal fragments, plant or animal waste products, combinations or derivatives of any of the foregoing, and so on.

In some variations, anti-fouling structures are created by a heterogeneous microstructure comprising a low-surface-energy polymer that is interspersed with hygroscopic domains (lubricating inclusions). Debris impacting the surface has low adhesion energy with the surface, due to the presence of the low-surface-energy polymer, and the debris will not remain on the surface.

Preferred embodiments employ fluoropolymers, without limitation of the invention, as described in more detail below. A preferred technique to compatiblize fluoropolymers and hygroscopic materials is the use of segmented polyurethane or urea systems. These species demonstrate strong hydrogen bonding potential between them and as a result can create strong associative forces between the chains. In order to produce elastomeric materials, regions of highly flexible and weakly interacting chains (soft segments) must be incorporated with strongly associating elements (hard segments) and this can be provided in a segmented copolymerization scheme. Segmented copolymers provide a straightforward synthetic route toward block architectures using segments with vastly differing properties. Such synthesis results in chains that possess alternating hard and soft segments composed of regions of high urethane bond density and the chosen soft segment component (e.g., fluoropolymer or hygroscopic element), respectively. This covalent linkage of dissimilar hard and soft blocks drives the systems to microphase separation and creates regions of flexible soft blocks surrounding regions of hard blocks. The associative forces among the hard segments prevent flow under stress and can produce elastomeric materials capable of displaying high elongation and tensile strength.

It has now been discovered that the hygroscopic or water-absorbing character of the overall polymer film can be enhanced by the addition of ionic species as a hygroscopic soft segment component to complement the fluorinated soft segment, or as a separate soft segment in conjunction with other soft segments present. Due to their highly polar nature, ionic species have the ability to efficiently absorb water either when submerged in aqueous solution or naturally from the air in vapor form.

As used herein, an "ionic species" refers to ionized or ionizable molecules which may be in the form of, or precursors to, anions, cations, or zwitterions. Ionic species may include (or be ionizable to) a full charge such as $-1$, $-2$, $-3$, $+1$, $+2$, $+3$, a fractional charge such as $-0.5$, $+0.5$, $-1.5$ or $+1.5$, or a partial charge which in principle may be any fraction of charge. "Ionizable" means that the molecule is neutral, i.e. net charge of 0, but capable of forming an anion, cation, or zwitterion; or that it is ionized but is capable of forming an anion, cation, or zwitterion having a larger magnitude of charge.

In some embodiments, the ionic species are high-molecular-weight polyelectrolytes or polyelectrolyte precursors, some of which are described in U.S. patent application Ser. No. 14/829,640, which has been incorporated by reference above. A "polyelectrolyte" is defined as a macromolecule in which a substantial portion of the constitutional units have ionizable or ionic groups, or both.

Some embodiments incorporate small-molecule charged groups (i.e., polymer pendant groups) along the chain backbone at various locations, depending on the order of addition. In these embodiments, the electrical charge is typically present within the pendant group, not in the polymer backbone itself.

In some embodiments, the ionic species are classified as ionomers. An "ionomer" is a polymer composed of ionomer molecules. An "ionomer molecule" is a macromolecule in which a small but significant proportion of the constitutional units have ionizable or ionic groups, or both. Some embodiments employ urethane-based ionomers capable of changing their crosslinked state under the influence of a change in counter ion valance.

A zwitterion is a neutral molecule with a positive as well as a negative electrical charge. Multiple positive and negative charges may be present. Zwitterions are distinct from dipoles, at different locations within that molecule. Zwitterions are sometimes also called inner salts. Unlike simple amphoteric compounds that might only form either a cationic or anionic species depending on external conditions, a zwitterion simultaneously has both ionic states in the same molecule.

In addition to one or more ionic species, various counterions may be present, either intentionally or arising from external conditions. A counterion may or may not be present; that is, there may be a net charge associated with the ionic species, or there may be charge neutrality if a sufficient amount of counterions are ionically associated with the ionic species. It is possible for there to be partial neutralization due to counterions, so that the effective charge is something between the ionic species charge and 0. It is also possible for there to be, at least for some period of time, an excess of counterions so that the effective charge is greater than the ionic species charge (i.e. more positive or more negative when the ionic species is cationic or anionic, respectively).

Ionic constituents in polymers are both water-absorbing and typically bound with counterions. When incorporated into polymer systems, ionic species have the ability to change the bulk and surface properties in response to materials bound to the network. These charged constituents, when incorporated into the polymer coating, can demonstrate reversible interchain cross-linking in some embodiments. Upon addition into the polymer, the functional groups may be protonated and uncharged, allowing the network to be held together by the hydrogen bonding in hard-segment domains of concentrated urethane bonds. To crosslink polymer films with metal ions, films may be soaked in metal-containing solutions, such as calcium hydroxide ($Ca(OH)_2$) solutions. Calcium ions are known to bind very tightly to carboxylic acid groups where their divalent nature can act as a bridge between two monovalent carboxylate species to crosslink chains into an overall network. The material may subsequently be soaked in an acidic solution, such as hydrochloric acid solutions, to protonate the carboxylic acid groups for removal of $Ca^{2+}$ ions, in reversible crosslinking.

An ionomer is a polymer that comprises repeat units of both electrically neutral repeating units and a fraction of ionized units (usually no more than 15 mole percent) covalently bonded to the polymer backbone as pendant group moieties. This means that ionomers are commonly copolymers of the neutral segments and the ionized units, which may consist of (as an example) carboxylic acid groups.

Ionomer synthesis may include the introduction of acid groups to the polymer backbone and the neutralization of some of the acid groups by a metal cation. In some embodiments, the groups introduced are already neutralized by a metal cation. The introduction of acid groups may be achieved by copolymerizing a neutral non-ionic monomer with a monomer that contains pendant acid groups. Alternatively, acid groups may be added to a non-ionic polymer through post-reaction modifications. Typically, the acid form of the copolymer is synthesized (i.e. all of the acid groups are neutralized by hydrogen cations) and the ionomer is formed through subsequent neutralization by a metal cation. The identity of the neutralizing metal cation has an effect on the physical properties of the ionomer. An acid copolymer may be melt-mixed with a basic metal or neutralization may be achieved through solution processes.

The classification of a polymer as an ionomer versus polyelectrolyte (see below) depends on the level of substitution of ionic groups as well as how the ionic groups are incorporated into the polymer structure. For example, polyelectrolytes also have ionic groups covalently bonded to the polymer backbone, but have a higher ionic group molar substitution level (usually greater than 80%).

Polyelectrolytes (charged molecular chains) are polymers whose repeating units bear an electrolyte group. Polycations and polyanions are polyelectrolytes. These groups dissociate in aqueous solutions, making the polymers charged. Polyelectrolyte properties are thus similar to both electrolytes (salts) and polymers and are sometimes called polysalts. Like salts, their solutions are electrically conductive. Like polymers, their solutions are often viscous.

Polyelectrolytes can be divided into weak and strong types. A strong polyelectrolyte is one which dissociates completely in solution for most reasonable pH values. A weak polyelectrolyte, by contrast, has a dissociation constant in the range of about 2 to 10, meaning that it will be partially dissociated at intermediate pH. Thus, weak polyelectrolytes are not fully charged in solution, and their fractional charge can be modified by changing the solution pH, counterion concentration, or ionic strength.

A polyacid is a polyelectrolyte composed of macromolecules containing acid groups on a substantial fraction of the constitutional units. For example, the acid groups may be $-COOH$, $-SO_3H$, or $-PO_3H_2$. Polyelectrolytes which bear both cationic and anionic repeat groups are called polyampholytes.

In some embodiments of the invention, the ionic species include two or more reactive groups such as alcohol or amine moieties. Specific example include, but are not limited to, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis (hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalcium salt, 2,2-bis(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3$\lambda^4$-imidazol-1-ium bromide, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, and bis(2-hydroxypropyl) aniline.

Partial atomic charges can be used to quantify the degree of ionic versus covalent bonding of any particular compound that is selected as, or may be a candidate for, an ionic species. Partial charges for a given ionic species can be estimated in multiple ways, such as: densities; measured dipole moments; the Extended Born thermodynamic cycle, including an analysis of ionic bonding contributions; the influence of coordination numbers and aggregate state of a given compound on atomic charges; the relationship of atomic charges to melting points, solubility, and cleavage energies for a set of similar compounds with similar degree of covalent bonding; the relationship of atomic charges to chemical reactivity and reaction mechanisms for similar compounds; or the relationship between chemical structure and atomic charges for comparable compounds with known atomic charges.

Partial charges in ionic species may be determined by population analysis of wavefunctions (e.g., Mulliken population analysis, Coulson's charges, etc.); partitioning of electron density distributions (e.g., Bader charges, Hirshfeld charges, Politzer's charges, etc.); charges derived from dipole-dependent properties (e.g., dipole charges, dipole derivative charges, Born, Callen, or Szigeti effective charges, etc.); charges derived from electrostatic potential (e.g., Chelp, Merz-Singh-Kollman, etc.); charges derived from spectroscopic data (e.g., charges from infrared intensities, X-ray photoelectron spectroscopy, X-ray emission spectroscopy, X-ray absorption spectra, UV-vis intensities of transition metal complexes, etc.); charges from other experimental data (e.g., charges from bandgaps or dielectric constants, apparent charges from the piezoelectric effect, charges derived from adiabatic potential energy curves, or electronegativity-based charges), or formal charges.

In a specific embodiment, there is provided a segmented copolymer composition. The composition comprises one or more α,ω (alpha, omega)-amine-terminated or α,ω (alpha, omega)-hydroxyl-terminated polyfluoropolymer first soft segments having an average molecular weight of between about 500 grams per mole to about 20,000 grams per mole. The exemplary composition further comprises one or more polyethylene glycol second soft segments having an average molecular weight of between about 500 grams per mole to about 20,000 grams per mole. Additionally, the composition may comprise one or more low-molecular-weight charged monomer species. A total content of the one or more first soft segments and the one or more second soft segments is from about 40% by weight to about 90% by weight, based on a total weight percent of the composition. The composition further comprises one or more hard segments present, for example, in an amount of from about 15% by weight to about 50% by weight, based on the total weight percent of the composition. The one or more hard segments comprise a combination of one or more isocyanate species and one or more low-molecular-weight polyol or polyamine chain extenders or crosslinkers.

Some variations provide a segmented copolymer composition comprising:

(a) one or more first soft segments selected from fluoropolymers having an average molecular weight from about 500 g/mol to about 20,000 g/mol, wherein the fluoropolymers are (α,ω)-hydroxyl-terminated and/or (α,ω)-amine-terminated;

(b) optionally, one or more second soft segments selected from polyesters or polyethers, wherein the polyesters or polyethers are (α,ω)-hydroxyl-terminated and/or (α,ω)-amine-terminated;

(c) one or more ionic species contained within the soft segments and/or contained in copolymer chains that are distinct from the soft segments;

(d) one or more isocyanate species, or a reacted form thereof, possessing an isocyanate functionality of 2 or greater; and (e) one or more polyol or polyamine chain extenders or crosslinkers, or a reacted form thereof.

It is noted that (α,ω)-terminated polymers are terminated at each end of the polymer. The α-termination may be the same or different than the ω-termination. Also it is noted that in this disclosure, "(α,ω)-termination" includes branching at the ends, so that the number of terminations may be greater than 2 per polymer molecule. The polymers herein may be linear or branched, and there may be various terminations and functional groups within the polymer chain, besides the end (α,ω) terminations.

In some embodiments, the molar ratio of the second soft segments (when present) to the first soft segments is from about 0.1 to about 2.0. In various embodiments, the molar ratio of the second soft segments to the first soft segments is about 0, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers in their own right and have on average two or more hydroxyl groups per molecule. For example, α,ω-hydroxyl-terminated perfluoropolyether is a type of polyol.

"Isocyanate" is the functional group with the formula —N=C=O. For the purposes of this disclosure, S—C(=O)—N(H)—R is considered a derivative of isocyanate.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers can have an average functionality greater than 2 (such as 3 or greater), i.e. beyond diols or diamines.

The one or more chain extenders or crosslinkers (or reaction products thereof) may be present in a concentration, in the segmented copolymer composition, from about 0.01 wt % to about 10 wt %, such as about 0.05 wt % to about 1 wt %.

As meant herein, a "low-surface-energy polymer" means a polymer, or a polymer-containing material, with a surface energy of no greater than 50 mJ/m$^2$. The principles of the invention may be applied to low-surface-energy materials with a surface energy of no greater than 50 mJ/m$^2$, in general (i.e., not necessarily limited to polymers).

In some embodiments, the low-surface-energy polymer includes a fluoropolymer, such as (but not limited to) a fluoropolymer selected from the group consisting of polyfluoroethers, perfluoropolyethers, fluoroacrylates, fluorosilicones, and combinations thereof.

In these or other embodiments, the low-surface-energy polymer includes a siloxane. A siloxane contains at least one Si—O—Si linkage. The low-surface-energy polymer may consist of polymerized siloxanes or polysiloxanes (also known as silicones). One example is polydimethylsiloxane.

In some embodiments, the fluoropolymers are selected from the group consisting of perfluoropolyethers, polyfluoroacrylates, polyfluorosiloxanes, and combinations thereof. In certain embodiments, the fluoropolymers include a fluoropolymer copolymer with poly(ethylene glycol) having the formula HO—(CH$_2$—CH$_2$—O)$_p$—CH$_2$—CF$_2$—O—(CF$_2$—CF$_2$—O)$_m$(CF$_2$—O)$_n$—CF$_2$—CH$_2$—(O—CH$_2$—CH$_2$)$_p$—OH (p=0 to 50; m=1 to 100; and n=1 to 100), with the following structure:

wherein:
X=CH$_2$—(O—CH$_2$—CH$_2$)$_p$—OH wherein p=0 to 50;
m=1 to 100; and
n=1 to 100.

In certain embodiments, the chain ends include different PEG chain lengths. That is, the fluoropolymers may include a fluoropolymer segmented copolymer with poly(ethylene glycol) having the formula HO—(CH$_2$—CH$_2$—O)$_p$—CH$_2$—CF$_2$—O—(CF$_2$—CF$_2$—O)$_m$(CF$_2$—O)$_n$—CF$_2$—CH$_2$—(O—CH$_2$—CH$_2$)$_q$—OH wherein p=0 to 50; q=0 to 50 and q is independently selected from p; m=1 to 100; and n=1 to 100. In certain of these embodiments, one of either p or q is selected from 6 to 50 while the other is selected from 0 to 50. In some embodiments, one or both of the X groups is amine-terminated rather than hydroxyl-terminated.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extender possesses a functionality of 2 or greater, in some embodiments. At least one polyol or polyamine chain extender may be selected from the group consisting of 1,4-butanediol, 1,3-propanediol, 1,2-ethanediol, glycerol, trimethylolpropane, ethylenediamine, isophoronediamine, diaminocyclohexane, and homologues, derivatives, or combinations thereof.

Following a suitable chemical reaction, the segmented copolymer composition contains, in a hard segment, the reacted form of the one or more isocyanate species, combined with the reacted form of the one or more polyol or polyamine chain extenders or crosslinkers. In some embodiments, the hard segment is present in an amount from about 5 wt % to about 60 wt %, based on total weight of the composition.

The segmented copolymer composition may be present in a coating, for example. Such a coating may be characterized by a contact angle of water on a coating surface of greater than 90°. Such a coating may be characterized by an average kinetic delay of surface ice formation of at least 5 minutes at −10° C.

Figure 1:
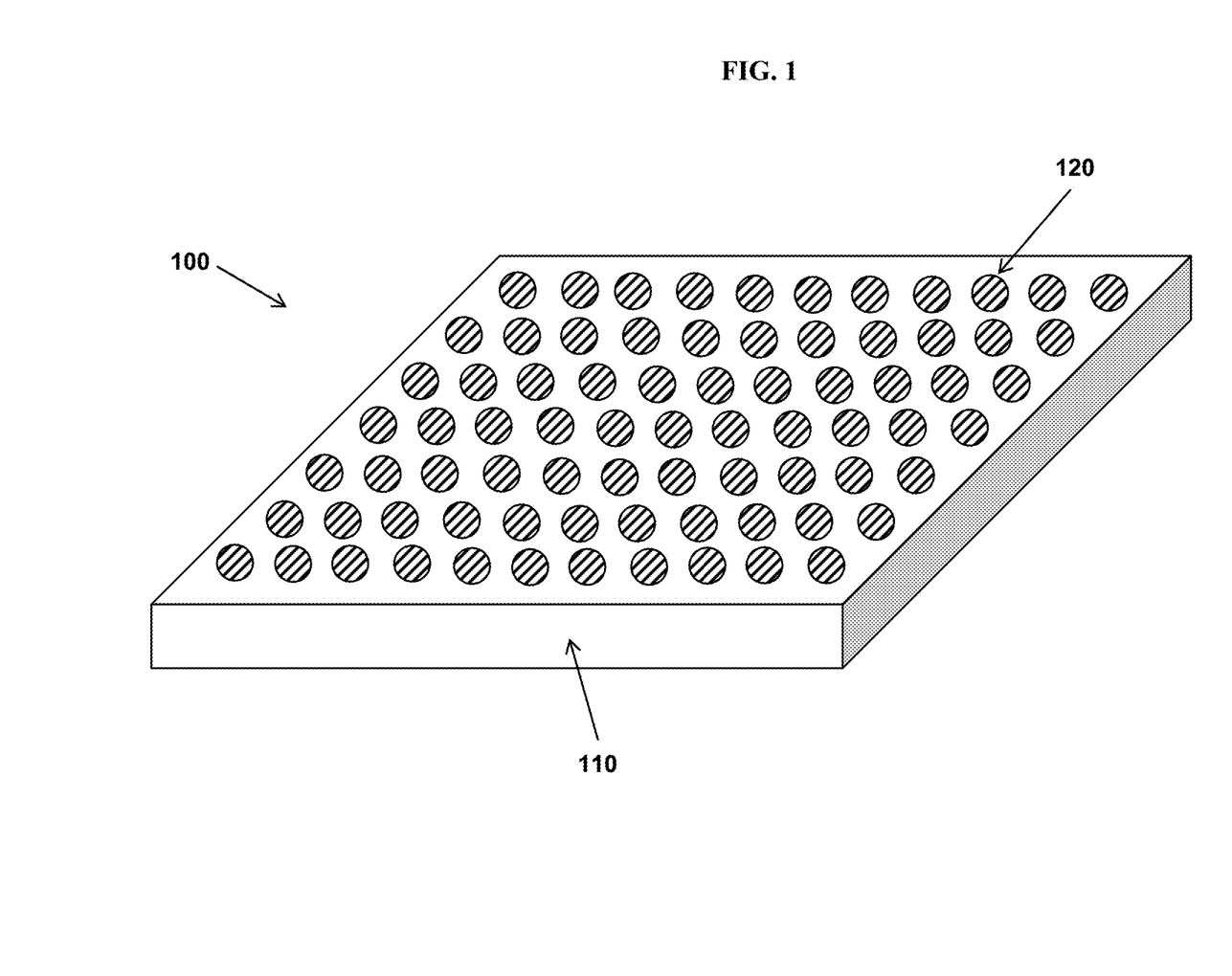
FIG. 1 depicts the structure of some variations of the invention, providing an anti-fouling material.

The structure of some variations of the invention is shown in FIG. 1. FIG. 1 depicts the structure of a coating or surface with anti-fouling properties.

The structure 100 of FIG. 1 includes a continuous matrix 110. A "continuous matrix" (or equivalently, "substantially continuous matrix") means that the matrix material is present in a form that includes chemical bonds among molecules of the matrix material. An example of such chemical bonds is crosslinking bonds between polymer chains. The structure 100 further includes a plurality of inclusions 120, dispersed within the matrix 110, each of the inclusions 120 comprising a hygroscopic material containing one or more ionic species. In certain embodiments, the hygroscopic material is fabricated from ionomers, polyelectrolytes, and/or other ionic species described above. Note that the functions of the matrix and inclusions may be reversed, such that the matrix provides hygroscopic properties while the inclusions provide low surface energy.

Optionally, the continuous matrix 110 may further comprise one or more additives selected from the group consisting of fillers, colorants, UV absorbers, defoamers, plasticizers, viscosity modifiers, density modifiers, catalysts, and scavengers. In a substantially continuous matrix 110, there may be present various defects, cracks, broken bonds, impurities, additives, and so on.

Some variations provide an anti-fouling material (e.g., coating or bulk material) comprising:
a substantially continuous matrix containing a first component;
a plurality of inclusions containing a second component, wherein the inclusions are dispersed within the matrix;
wherein one of the first component or the second component is a low-surface-energy polymer having a surface energy between about 5 mJ/m$^2$ to about 50 mJ/m$^2$, and the other of the first component or the second component is a hygroscopic material containing one or more ionic species,
wherein the low-surface-energy polymer and the hygroscopic material are chemically connected ionically or covalently,
and wherein the continuous matrix and the inclusions form a lubricating surface layer in the presence of humidity.

In some embodiments, the surface energy of the low-surface-energy polymer is between about 10 mJ/m$^2$ to about 40 mJ/m$^2$, such as about 10, 15, 20, 25, 30, 35, or 40, mJ/m$^2$. In some preferred embodiments, the low-surface-energy polymer is a fluoropolymer selected from the group consisting of polyfluoroethers, perfluoropolyethers, polyfluoroacrylates, polyfluorosiloxanes, and combinations thereof.

The hygroscopic material may include a material selected from the group consisting of 2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3λ$^4$-imidazol-1-ium bromide, 2,2-bis(hydroxymethyl) butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl) piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldietha-nolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

The hygroscopic material may include a material selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacryalate, monoacrylate, and combinations thereof. When the hygroscopic material includes one or more of the materials from this list, the hygroscopic material may further include one or more ionic species selected from the group consisting of 2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3λ$^4$-imidazol-1-ium bromide, 2,2-bis (hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl) propionic acid, 1,4-bis(2-hydroxyethyl)piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis (2-hydroxypropyl) aniline, and homologues, combinations, derivatives, or reaction products thereof.

The low-surface-energy polymer and the hygroscopic material may be phase-separated, i.e. they do not form a single continuous phase. There is preferably chemical and/or physical bonding between the low-surface-energy polymer and the hygroscopic material.

In some embodiments, the inclusions are three-dimensional objects or domains, which may be of any shape, geometry, or aspect ratio. In a three-dimensional object, an aspect ratio of exactly 1.0 means that all three characteristic length scales are identical, such as in a perfect cube. The aspect ratio of a perfect sphere is also 1.0. The inclusions may be geometrically symmetric or asymmetric. Randomly shaped asymmetric templates are, generally speaking, geometrically asymmetric. In some embodiments, inclusions are geometrically symmetric. Examples include cylinders, cones, rectangular prisms, pyramids, or three-dimensional stars.

In some embodiments, the inclusions are anisotropic. As meant herein, "anisotropic" inclusions have at least one chemical or physical property that is directionally dependent. When measured along different axes, an anisotropic inclusion will have some variation in a measurable property. The property may be physical (e.g., geometrical) or chemical in nature, or both.

The inclusions may be characterized as templates, domains, or regions (such as phase-separated regions). The inclusions are not a single, continuous framework in the coating. Rather, the inclusions are discrete, non-continuous and dispersed in the continuous matrix. The hygroscopic inclusions may be dispersed uniformly within the continuous matrix. In some anti-fouling materials, the low-surface-energy polymer and the hygroscopic material are covalently connected in a block copolymer, in which the inclusions and the continuous matrix are distinct phases of the block copolymer.

As intended herein, a "block copolymer" means a copolymer containing a linear arrangement of blocks, where each block is defined as a portion of a polymer molecule in which the monomeric units have at least one constitutional or configurational feature absent from the adjacent portions. Several types of block copolymers are generally possible, including AB block copolymers, ABA block copolymers, ABC block copolymers, segmented block copolymers, and random copolymers. Segmented block copolymers are preferred, in some embodiments of the invention.

For example, a block copolymer may be a segmented copolymer composition comprising:

(a) one or more first soft segments selected from fluoropolymers having an average molecular weight from about 500 g/mol to about 20,000 g/mol, wherein the fluoropolymers are ($\alpha,\omega$)-hydroxyl-terminated and/or ($\alpha,\omega$)-amine-terminated;

(b) optionally, one or more second soft segments selected from polyesters or polyethers, wherein the polyesters or polyethers are ($\alpha,\omega$)-hydroxyl-terminated and/or ($\alpha,\omega$)-amine-terminated;

(c) one or more ionic species contained within the soft segments and/or contained in copolymer chains that are distinct from the soft segments;

(d) one or more isocyanate species, or a reacted form thereof, possessing an isocyanate functionality of 2 or greater; and (e) one or more polyol or polyamine chain extenders or crosslinkers, or a reacted form thereof.

In some embodiments, the fluoropolymers include a fluoropolymer having the structure:

wherein:
X=$CH_2$—(O—$CH_2$—$CH_2$)$_p$—OH wherein p=0 to 50;
m=1 to 100; and
n=1 to 100.

In some embodiments, the polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the molar ratio of the second soft segments to the first soft segments is less than 2.0, such as from about 0.1 to about 1.5.

A wide range of concentrations of components may be present in the anti-fouling material. For example, the continuous matrix may be from about 5 wt % to about 95 wt %, such as from about 10 wt % to about 50 wt % of the material. The inclusions may be from about 1 wt % to about 90 wt %, such as from about 10 wt % to about 50 wt % of the coating.

Within the component containing the low-surface-energy polymer, the low-surface-energy polymer may be from about 50 wt % to 100 wt %, such as about 60, 70, 80, 90, 95, or 100 wt %. Within the component containing the hygroscopic material, the hygroscopic material may be from about 50 wt % to 100 wt %, such as about 60, 70, 80, 90, 95, or 100 wt %.

The low-surface-energy polymer and/or the hygroscopic material may be surface-treated, such as to adjust hydrophobicity. The anti-fouling material optionally further contains one or more additional components selected from the group consisting of a particulate filler, a pigment, a dye, a plasticizer, a flame retardant, a flattening agent, and a substrate adhesion promoter.

A particulate filler may be selected from the group consisting of silica, alumina, silicates, talc, aluminosilicates, barium sulfate, mica, diatomite, calcium carbonate, calcium sulfate, carbon, wollastonite, and combinations thereof. The particulate fillers generally should be in the size range of about 5 nm to about 2 µm, such as about 20 nm to 100 nm.

The particulate fillers may be surface-modified with a compound selected from the group consisting of fatty acids, silanes, silicones, alkyl phosphonates, alkyl phosphonic acids, alkyl carboxylates, and combinations thereof. Optionally, the fillers may be surface-modified with a hydrophobic material, such as (but not limited to) an alkylsilane, a fluoroalkylsilane, and/or an alkyldisilazane (e.g., hexamethyldisilazane).

In some embodiments, the anti-fouling material further includes voids. As intended herein, a "void" is a discrete region of empty space, or space filled with air or another gas, that is enclosed within the continuous matrix. The voids may be open (e.g., interconnected voids) or closed (isolated within the continuous matrix), or a combination thereof. The voids may partially surround inclusions.

The domains of hygroscopic material exist throughout the material, in both planar and depth dimensions. The anti-fouling function is retained even after some sort of abrasion of the top layer of the material.

Some compositions include both a polyether and an aliphatic diol carrying an acid group as part of the composition, but does not include aliphatic diols containing long carbon chains having >10 carbons. Some embodiments do not incorporate polyols containing three or more reactive hydroxyl groups. Some compositions contain ionizable groups in combination with perfluoropolyethers, but do not incorporate silanes for crosslinking. Preferred embodiments do not incorporate waterborne polyurethanes with charged groups to create stable colloidal dispersions in water.

The coefficient of friction of the anti-fouling material is relatively low due to the presence of a lubricating surface layer in the presence of humidity. By a "lubricating surface layer in the presence of humidity," it is meant a layer, multiple layers, a partial layer, or an amount of substance that lubricates the substrate such that it has a lower coefficient of friction compared to the substrate without the material present, when in the presence of some amount of atmospheric humidity.

The specific level of humidity is not regarded as critical, but in general may range from about 1% to 100%, typically about 30% to about 70% relative humidity. Relative humidity is the ratio of the water vapor density (mass per unit volume) to the saturation water vapor density. Relative humidity is approximately the ratio of the actual partial pressure of water vapor to the saturation (maximum) vapor pressure of water in air.

The substance that lubricates the substrate is primarily water, but it should be noted that other components from the environment may be present in the lubricating surface layer, including oils, metals, dust, dissolved gases, dissolved aqueous components, suspended non-aqueous components, fragments of debris, fragments of polymers, and so on.

In some embodiments, the anti-fouling material is characterized by a coefficient of friction, measured at 40-55% (e.g. 50%) relative humidity and room temperature, less than 0.5, 0.4, 0.3, 0.2, 0.15 or less. In these or other embodiments, the anti-fouling material is characterized by a coefficient of friction, measured at 85-90% relative humidity and room temperature, less than 0.8, 0.7, 0.6, 0.5, 0.4, 0.3, 0.2, 0.15, or less.

The anti-fouling material may be characterized by a surface contact angle of water of greater than 90° (hydrophobic). In various embodiments, the material is characterized by an effective contact angle of water of about 80°, 85°, 90°, 95°, 100°, 105°, 110°, or higher. The material may also be hydrophilic, i.e. characterized by an effective contact angle of water that is less than 90°.

The material may also be lipophobic or partially lipophobic in some embodiments. In various embodiments, the anti-fouling material is characterized by an effective contact angle of hexadecane (as a measure of lipophobicity) of about 50°, 55°, 60°, 65°, 70°, 75°, 80°, 85°, 90°, or higher.

The anti-fouling material may simultaneously have hydrophobic and lipophobic properties. In certain embodiments, the material is characterized by an effective contact angle of water of at least 90° (such as about 95-110°) and simultaneously an effective contact angle of hexadecane of at least 60° (such as about) 65°. In certain embodiments, the material is characterized by an effective contact angle of water of at least 80° (such as about 80-85°) and simultaneously an effective contact angle of hexadecane of at least 70° (such as about 75-80°).

The anti-fouling material may be characterized by a water absorption capacity of at least 10 wt % water based on total weight of the anti-fouling material. The material is characterized, according to some embodiments, by a water absorption capacity of at least 1, 2, 3, 4, 5, 6, 7, 8, or 9 wt % water, preferably at least 10, 11, 12, 13, 14, 15, 16, 17, 18, 19, or 20 wt % water, based on total weight of the material.

The anti-fouling material may be characterized by a delay in the formation of ice on a surface of the material. For example, when an anti-fouling material surface is held at $-10°$ C., the material provided by the invention may be characterized by an average delay in the formation of ice on the surface of at least about 10, 15, 20, 25, 30 minutes, or more.

In various embodiments, the anti-fouling material is a coating and/or is present at a surface of an object or region. The material may be utilized in relatively small applications, such as lens coatings, or for large structures, such as aircraft wings. In principle, the material could be present within a bulk region of an object or part, or could contain a temporary, protective laminating film for storage or transport, which is later removed to adhere to the vehicle, for example.

Variations of the invention also provide a precursor material for an anti-fouling material, the precursor material comprising:

a hardenable material capable of forming a substantially continuous matrix containing a first component; and a plurality of inclusions containing a second component, wherein the inclusions are dispersed within the hardenable material, wherein one of the first component or the second component is a low-surface-energy polymer having a surface energy between about 5 mJ/m$^2$ to about 50 mJ/m$^2$, and the other of the first component or the second component is a hygroscopic material containing one or more ionic species, and wherein the low-surface-energy polymer and the hygroscopic material are chemically connected ionically or covalently.

In some embodiments, the surface energy of the low-surface-energy polymer is between about 10 mJ/m$^2$ to about 40 mJ/m$^2$, such as about 10, 15, 20, 25, 30, 35, or 40, mJ/m$^2$. In some embodiments, the low-surface-energy polymer is a fluoropolymer, such as one selected from the group consisting of polyfluoroethers, perfluoropolyethers, polyfluoroacrylates, polyfluorosiloxanes, and combinations thereof.

In some embodiments, the hygroscopic material in the precursor material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrrolidone), cellulose, modified cellulose, carboxymethyl cellulose, hydroxyethyl cellulose, hydroxypropyl cellulose, methyl cellulose, hydrogels, PEG diacryalate, monoacrylate, and combinations thereof. Alternatively, or additionally, the hygroscopic material may comprise one or more ionic species selected from the group consisting of 2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3$\lambda^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2- hydroxyethyl)piperazine, 2,6-diaminocaproic acid, N,N-bis (2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

The low-surface-energy polymer and the hygroscopic material may be covalently connected, or are capable of being covalently connected, in a block copolymer. For example, a block copolymer (in the precursor material) may be a segmented copolymer composition comprising:

(a) one or more first soft segments selected from fluoropolymers having an average molecular weight from about 500 g/mol to about 20,000 g/mol, wherein the fluoropolymers are (α,ω)-hydroxyl-terminated and/or (α,ω)-amine-terminated;

(b) optionally, one or more second soft segments selected from polyesters or polyethers, wherein the polyesters or polyethers are (α,ω)-hydroxyl-terminated and/or (α,ω)-amine-terminated;

(c) one or more ionic species contained within the soft segments and/or contained in copolymer chains that are distinct from the soft segments;

(d) one or more isocyanate species, or a reacted form thereof, possessing an isocyanate functionality of 2 or greater; and (e) one or more polyol or polyamine chain extenders or crosslinkers, or a reacted form thereof.

In some embodiments, the fluoropolymers include a fluoropolymer having the structure:

wherein:
X=CH$_2$—(O—CH$_2$—CH$_2$)$_p$—OH wherein p=0 to 50;
m=1 to 100; and
n=1 to 100.

The low-surface-energy polymer and/or the hygroscopic material may be surface-treated, either prior to introduction into the precursor material or prior to conversion of the precursor material to the anti-fouling material.

The precursor material may further contain one or more additional components selected from the group consisting of a particulate filler, a pigment, a dye, a plasticizer, a flame retardant, a flattening agent, and a substrate adhesion promoter. Alternatively, or additionally, such additional components may be introduced during the conversion of the precursor material to the anti-fouling material, or to the anti-fouling material after it is formed.

Specific particulate fillers include, for example, silica, alumina, silicates, talc, aluminosilicates, barium sulfate, mica, diatomite, calcium carbonate, calcium sulfate, carbon, wollastonite, and combinations thereof. The particulate fillers generally should be in the size range of about 5 nm to about 2 μm, such as about 20 nm to 100 nm.

The particulate fillers may be surface-modified with a compound selected from the group consisting of fatty acids, silanes, silicones, alkyl phosphonates, alkyl phosphonic acids, alkyl carboxylates, and combinations thereof. Optionally, the fillers may be surface-modified with a hydrophobic material, such as (but not limited to) an alkylsilane, a fluoroalkylsilane, and/or an alkyldisilazane (e.g., hexamethyldisilazane).

Any known methods to fabricate these materials or coatings may be employed. Notably, these materials or coatings may utilize synthesis methods that enable simultaneous deposition of components or precursor materials to reduce fabrication cost and time. In particular, these materials or coatings may be formed by a one-step process, in some embodiments. In other embodiments, these materials or coatings may be formed by a multiple-step process. Preferred coatings are cast or sprayed from organic solution rather than aqueous solution.

The anti-fouling hydrophobic or hydrophilic material, in some embodiments, is formed from a precursor material (or combination of materials) that may be provided, obtained, or fabricated from starting components. The precursor material is capable of hardening or curing in some fashion, to form a substantially continuous matrix along with a plurality of inclusions, dispersed within the matrix. The precursor material may be a liquid; a multiphase liquid; a multiphase slurry, emulsion, or suspension; a gel; or a dissolved solid (in solvent), for example.

The low-surface-energy polymer and the hygroscopic material may be in the same phase or in different phases. In some embodiments, the low-surface-energy polymer is in liquid or dissolved form while the hygroscopic material is in dissolved-solid or suspended solid form. In some embodiments, the low-surface-energy polymer is dissolved-solid or suspended-solid form while the hygroscopic material is in liquid or dissolved form. In some embodiments, the low-surface-energy polymer and the hygroscopic material are both in liquid form. In some embodiments, the low-surface-energy polymer and the hygroscopic material are both in dissolved (solvent) form.

Some embodiments employ one-shot polymerization to produce a copolymer. In one-shot polymerization, the reactants (e.g., fluoropolymer, isocyanate species, and polyol or polyamine chain extenders or crosslinkers) are mixed together in the liquid phase in a suitable container, within a mold, or on a substrate, and allowed to react simultaneously. No prepolymer is first formed.

In some variations of the invention, a material or coating precursor is applied to a substrate (such as a surface of an automobile or aircraft) and allowed to react, cure, or harden to form a final coating, wherein the material, coating precursor, or final coating contains a segmented copolymer composition as disclosed herein.

In some embodiments, the hygroscopic material is also hardenable, either alone or in combination with the low-surface-energy polymer. For instance, a low-surface-energy polymer and a hygroscopic polymer may form a high-molecular-weight block copolymerize and thus harden. In certain embodiments, the hygroscopic material assists in the curability (hardenability) of the low-surface-energy polymer.

In some embodiments, a precursor material is prepared and then dispensed (deposited) over an area of interest. Any known methods to deposit precursor materials may be employed. A fluid precursor material allows for convenient dispensing using spray coating or casting techniques over a large area, such as the scale of a vehicle or aircraft.

The fluid precursor material may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), acids (such as organic acids), bases, and any mixtures thereof. When a solvent or carrier fluid is present, it may be in a concentration of from about 10 wt % to about 99 wt % or higher, for example.

The precursor material may be converted to an intermediate material or the final material using any one or more of curing or other chemical reactions, or separations such as removal of solvent or carrier fluid, monomer, water, or vapor. Curing refers to toughening or hardening of a polymeric material by cross-linking of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The overall thickness of the final material or coating may be from about 1 μm to about 1 cm or more, such as about 10 μm, 20 μm, 25 μm, 30 μm, 40 μm, 50 μm, 75 μm, 100 μm, 500 μm, 1 mm, 1 cm, or 10 cm. Relatively thick coatings offer good durability and mechanical properties, such as impact resistance, while preferably being relatively lightweight.

EXAMPLES

Materials. Poly(ethylene glycol) (PEG) with molecular weight ($M_n$) of 3,400 g/mol, 4,4'-methylenebis(cyclohexyl isocyanate) (HMDI), 1,4-butanediol (BD), dibutyltin dilaurate (DBTDL), and 2,2-bis(hydroxymethyl)propionic acid are purchased from Aldrich. Fluorolink materials are purchased from Solvay Specialty Polymers. All chemicals are used as received without further purification.

Example A: Fluoropolymer Control

Fluorolink D4000 perfluoropolyether (4 g) is charged to a vial followed by HMDI (0.786 g) and dibutyltin dilaurate (0.02% by weight). A small PTFE-coated stir bar is introduced and the vial is placed in a 100° C. oil bath to stir. The reaction is vortexed aggressively after achieving a temperature of 100° C., and then left to stir for 1 hour. After this step, the resin is poured into a 3"×3" PTFE mold to flash off solvent and cure the film at room temperature overnight.

Example B: Thermoplastic Polymer without Ionic Species

Hydroxyl-terminated poly(perfluoropolyether) (9.00 g, 3.73 mmol, Fluorolink 5147x) is placed in a 3-neck round-bottom flask that contains an inlet for argon and equipped with an overhead stirrer (Teflon shaft and blade). While stirring, 4,4'-methylenebis(cyclohexyl isocyanate) (4.89 g, 18.66 mmol) is added to the solution and the flask is placed in an oil bath at 100° C. Dibutyltin dilaurate (0.02 wt % by weight) is then added to the solution using a micropipette and the polymerization reaction is allowed to proceed.

After 1 hr, the prepolymer is then allowed to cool down to room temperature. The prepolymer is diluted with tetrahydrofuran (15 mL) and placed in a centrifugal mixer (FlackTek DAC 600).

In a separate vial, chain extender 1,4-butanediol (1.35 g, 14.98 mmol) is weighed and diluted with tetrahydrofuran (0.5 mL). The two solutions are combined in a centrifugal mixer and mixed at 2300 rpm for 15 seconds. The polymer is cast from solution or sprayed using an airbrush to create a polyurethane film/coating.

Example C: Thermoplastic Polymer with Ionic Species

Hydroxyl-terminated poly(perfluoropolyether) (9.00 g, 3.73 mmol, Fluorolink 5147x) is placed in a 3-neck round-bottom flask that contains an inlet for argon and equipped with an overhead stirrer (Teflon shaft and blade). While stirring, 4,4'-methylenebis(cyclohexyl isocyanate) (4.89 g, 18.66 mmol) is added to the solution and the flask is placed in an oil bath at 100° C. Dibutyltin dilaurate (0.02 wt % by weight) catalyst is then added to the solution using a micropipette and the polymerization reaction is allowed to proceed.

After 1 hr, the ionic species precursor 2,2-bis(hydroxymethyl)propionic acid (0.50 g, 3.74 mmol) is added to the stirring solution and allowed to dissolve and react for 1 hr. The prepolymer is then allowed to cool down to room temperature. The prepolymer is diluted with tetrahydrofuran (15 mL) and placed in a plastic mixing container for centrifugal mixing.

In a separate vial, chain extender 1,4-butanediol (1.01 g, 11.21 mmol) is weighed and diluted with tetrahydrofuran (0.5 mL). The two solutions are combined in mixing centrifugal mixer and mixed at 2300 rpm for 15 seconds to form polymer. The polymer is cast from solution or sprayed using an airbrush to create a polyurethane film/coating.

Multiple samples are prepared, as follows. Sample C1 is unsoaked, sample C2 is soaked in deionizied water, sample C3 is soaked in 0.01 M HCl, and sample C4 is soaked in 0.01 M Ca(OH)$_2$. Samples C1, C2, C3, and C4 are then tested in accordance with Example F (friction testing) below.

Example D: High-Molecular Weight PEG Combined with PFPE/PEG Triblock without Ionic Species Hydroxyl-terminated poly(ethylene glycol) ($M_n$=3400, 2.50 g, 0.74 mmol) is placed in a 3-neck roundbottom flask that contains an inlet for argon and equipped with an overhead stirrer (Teflon shaft and blade). While stirring, 4,4'-methylenebis(cyclohexyl isocyanate) (3.72 g, 14.20 mmol) is added to the solution and the flask is placed in an oil bath at 100° C. Dibutyltin dilaurate (0.02 wt % by weight) is then added to the solution using a micropipette and the polymerization reaction is allowed to proceed.

After 1 hr, Fluorolink E10-H (2.78 g, 1.40 mmol) is added to the stirring solution and allowed to react for 2 hr at 100° C. The prepolymer is then allowed to cool down to room temperature. The prepolymer is diluted with tetrahydrofuran (9.15 mL) and placed in a plastic mixing cup before inserting into the centrifugal mixer.

In a separate vial, 1,4-butanediol (0.77 g, 8.54 mmol) is weighed and diluted with tetrahydrofuran (0.5 mL). The two solutions are combined in a centrifugal mixer and mixed at 2300 rpm for 15 seconds. The polymer is cast from solution or sprayed using an airbrush to create a polyurethane film/coating.

Multiple samples are prepared, as follows. Sample D1 is unsoaked, sample D2 is soaked in deionizied water, and sample D3 is soaked in NaOH at pH=14. Samples D1, D2, and D3 are then tested in accordance with Example F (friction testing) below.

Example E: High-Molecular Weight PEG Combined with PFPE/PEG Triblock with Ionic Species Hydroxyl-terminated poly(ethylene glycol) (2.50 g, 0.74 mmol) is placed in a 3-neck roundbottom flask that contains an inlet for argon and equipped with an overhead stirrer (Teflon shaft and blade). While stirring, 4,4'-methylenebis(cyclohexyl isocyanate) (4.49 g, 17.14 mmol) is added to the solution and the flask is placed in an oil bath at 100° C. Dibutyltin dilaurate (0.02 wt % by weight) is then added to the solution using a micropipette and the polymerization reaction is allowed to proceed.

After 1 hr, the ionic species precursor 2,2-bis(hydroxymethyl)propionic acid (0.79 g, 5.89 mmol) is added to the stirring solution and allowed to dissolve and react for 1 hr. After 1 hr, Fluorolink E10-H (2.78 g, 1.40 mmol) is added to the stirring solution and allowed to react for 2 hr at 100° C. The prepolymer is then allowed to cool down to room temperature. The prepolymer is diluted with tetrahydrofuran (12.75 mL) and placed in a plastic mixing container for centrifugal mixing.

In a separate vial, 1,4-butanediol (0.77 g, 8.54 mmol) is weighed and diluted with tetrahydrofuran (0.5 mL). The two solutions are combined in a centrifugal mixer and mixed at 2300 rpm for 15 seconds. The polymer is cast from solution or sprayed using an airbrush to create a polyurethane film/coating.

Multiple samples are prepared, as follows. Sample E1 is unsoaked, sample E2 is soaked in deionizied water, sample E3 is soaked in NaOH at pH=14, sample E4 is soaked in HCl at pH=2, and sample E5 includes copper acetate exposure during synthesis of the sample. Samples E1, E2, E3, E4, and E5 are then tested in accordance with Example F (friction testing) below.

Example F: Friction Testing of Samples

The change in friction in response to humidity is tested by first equilibrating the coating samples of Examples A, B, C, D, and E at ambient (40-55%) relative humidity or 85-90% relative humidity in a humidity-controlled chamber. Then the coating samples are placed on a variable-angle stage and the angle is increased until a 5-gram cylindrical mass slides along the sample surface. The sliding angle is used to determine the friction constant (coefficient of friction).

Figure 2:
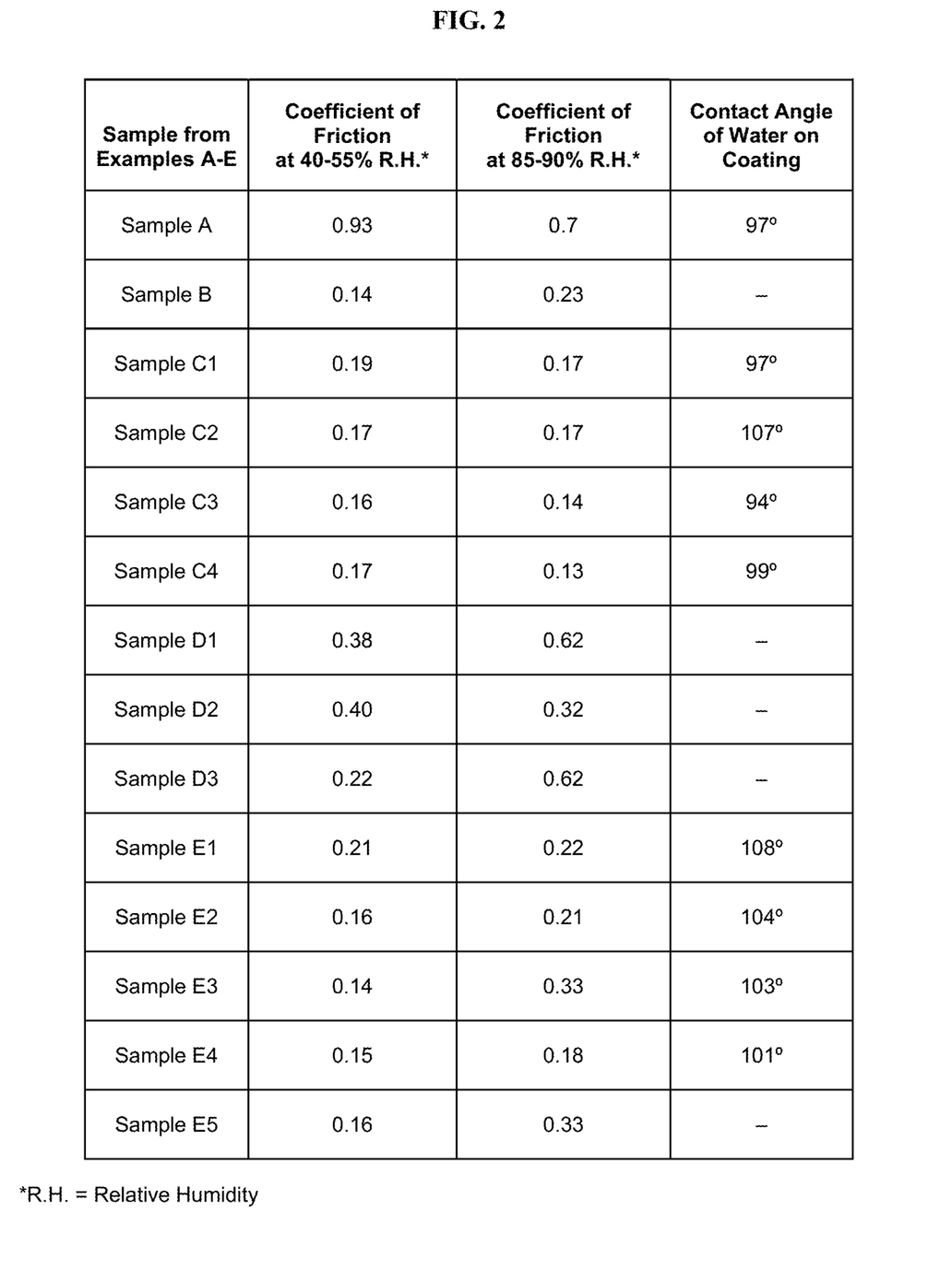
FIG. 2 includes a table of experimental data of coating samples from Examples A-F described herein.

The friction change is shown for the coating samples of Examples A-E in the table of FIG. 2. Contact angles of water are also shown for samples A, C1, C2, C3, C4, E1, E2, E3, E4, and E5. From the table in FIG. 2, sliding and coefficient-of-friction performance with different embodiments of the technology versus controls can be observed.

The initial control (sample B) is produced from a PFPE and isocyanate prepolymer mixture that is cast from solution and allowed to cure under the influence of atmospheric moisture. This composition has no hygroscopic component and shows a relatively higher coefficient of friction compared to other test samples at 85-90% relative humidity. Under the influence of increasing humidity, the coefficient of friction increased.

Examples B and C—linear thermoplastic polymer without and with ionic species, respectively—demonstrate the benefits of ionic charge on coefficient of friction and its behavior under increasing humidity. Example B incorporates a triblock precursor molecule with PFPE as the central block and poly(ethylene glycol) blocks on the terminal ends. According to the data for sample B, a coating from this mixture produces low coefficient of friction values but exhibits an increase in coefficient of friction with increased humidity.

The opposite is the case when ionic monomer species are introduced into the chain backbone (Example C). Coefficient of friction in samples C1, C2, C3, or C4 begins at 0.19 near 50% relative humidity and decreases or stays constant with increasing humidity. This data also indicates that, at constant relative humidity, the coefficient of friction is reduced after soaking the coating in water, HCl or Ca salt solutions. The coefficient of friction is as low as 0.13, for a 0.01 M $Ca(OH)_2$ soak of the coating then exposed to 85-90% relative humidity for the friction test.

Examples D and E use high-molecular-weight PEG as a first soft segment combined with a PFPE/PEG triblock as a second soft segment. Example E incorporates ionic species, while Example D is a control sample with no ionic species along the backbone. The system starts off at a higher coefficient of friction of 0.38 at 50% relative humidity, and with elevated humidity, the coefficient of friction increase to 0.62 (sample D1). Soaking in deionizied water reverses this trend and causes a drop in coefficient of friction (sample D2). However, exposure to basic solution conditions creates a situation that lowers coefficient of friction at 50% relative humidity while giving a dramatic (nearly two-fold) increase in coefficient of friction at 90% relative humidity (sample D3).

When carboxylic acid groups are incorporated into the backbone of these polymers (Example E), an overall decrease in the magnitude of the coefficient of friction is observed for each sample compared to the control sample, whether unsoaked (E1 versus D1), soaked in water (E2 versus D2), or soaked in basic solution (E3 versus D3). The relative increase in coefficient of friction with increased humidity is reduced for both the unsoaked and base-soaked sample.

Overall, these systems demonstrate the ability to be positively influenced through lower coefficient-of-friction performance by the incorporation of ionic species (free acid or charged species) along the chain backbone.

Vehicle-based cameras for surrounding awareness will require lens coatings that will inhibit soiling in order to function. Once soiled, the camera will lose effectiveness and eventually cease functioning. The coatings/surfaces described herein may be used as camera lens coatings.

Aircraft lose efficiency from disruption of laminar flow when insect and particulate debris collect on the aircraft wings. This invention provides materials that reduce the adhesion of insect and particulate debris on aircraft surfaces, while simultaneously inhibiting the formation of ice.

Other practical applications for the present invention include, but are not limited to, vehicle windows, optical lenses, filters, instruments, sensors, eyeglasses, cameras, satellites, and weapon systems. For example, automotive applications can utilize these coatings to prevent the formation of ice or debris on back-up camera lenses or back-up sensors. The principles taught herein may also be applied to self-cleaning materials, anti-adhesive coatings, corrosion-free coatings, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An anti-fouling coating comprising:
    a substantially continuous matrix containing a first component; and
    a plurality of inclusions containing a second component, wherein said inclusions are dispersed within said matrix;
    wherein one of said first component or said second component is a low-surface-energy polymer having a surface energy between about 5 mJ/m$^2$ to about 50 mJ/m$^2$, and the other of said first component or said second component is a hygroscopic material containing an ionic species,
    wherein said low-surface-energy polymer and said hygroscopic material are chemically connected ionically or covalently,
    wherein said continuous matrix and said inclusions form a lubricating surface layer in the presence of humidity,
    wherein said ionic species consists essentially of an anionic species possessing a charge of −1, or a cationic species possessing a charge of +1,
    wherein said ionic species is present in an ionic bond with a counterion consisting essentially of a monovalent ion of opposite charge as said ionic species to form a neutral molecule, wherein said counterion (a) has a charge of +1 when said ionic species consists essentially of an anionic species possessing a charge of −1 and (b) has a charge of −1 when said ionic species consists essentially of a cationic species possessing a charge of +1,
    and wherein said counterion is a metal ion.

2. The anti-fouling coating of claim 1, wherein said low-surface-energy polymer is a fluoropolymer selected from the group consisting of polyfluoroethers, perfluoropolyethers, polyfluoroacrylates, polyfluorosiloxanes, and combinations thereof.

3. The anti-fouling coating of claim 1, wherein said ionic species is selected from the group consisting of (2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3$\lambda^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl)propionic acid, 1,4-bis(2-hydroxyethyl)piperazine, 2,6-diaminocaproic acid, N,N-bis(2-hydroxyethyl)glycine, 2-hydroxypropanoic acid hemicalsium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

4. The anti-fouling coating of claim 3, wherein said hygroscopic material consists essentially of said ionic species.

5. The anti-fouling coating of claim 1, wherein said hygroscopic material includes a material selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

6. The anti-fouling coating of claim 1, wherein said low-surface-energy polymer and said hygroscopic material are covalently connected in a block copolymer.

7. The anti-fouling coating of claim 1, wherein said coating further comprises one or more additional components selected from the group consisting of a particulate filler, a substrate adhesion promoter, a pigment, a dye, a plasticizer, a flattening agent, and a flame retardant.

* * * * *